(12) United States Patent
Dolfi

(10) Patent No.: US 9,385,637 B2
(45) Date of Patent: Jul. 5, 2016

(54) BRAKE CONTROLLER

(71) Applicant: HAMILTON SUNDSTRAND CORPORATION, Windsor Locks, CT (US)

(72) Inventor: Eugene W. Dolfi, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 119 days.

(21) Appl. No.: 14/283,922

(22) Filed: May 21, 2014

(65) Prior Publication Data

US 2015/0340973 A1  Nov. 26, 2015

(51) Int. Cl.
*H02P 27/04* (2006.01)
*H02P 3/04* (2006.01)

(52) U.S. Cl.
CPC .................................. *H02P 3/04* (2013.01)

(58) Field of Classification Search
CPC .............. H02P 3/04; H02P 3/26; H02P 3/08; H02P 3/16; H02P 6/24; H02P 6/28
USPC ......... 318/273, 362, 363, 367, 374, 375, 376, 318/373, 371, 364, 365, 599, 600
See application file for complete search history.

(56) References Cited

U.S. PATENT DOCUMENTS

| | | | | |
|---|---|---|---|---|
| 3,953,083 A * | 4/1976 | Latvala | ............... | B60T 8/17613 303/156 |
| 4,027,049 A * | 5/1977 | Masuda | ............... | G03G 7/0093 430/47.5 |
| 4,511,945 A * | 4/1985 | Nielsen | ................... | F02D 41/20 123/490 |
| 4,620,565 A * | 11/1986 | Brown | .................. | B60T 8/3615 137/596.17 |
| 4,939,656 A * | 7/1990 | Hoashi | ...................... | B60T 8/48 180/197 |
| 4,949,215 A * | 8/1990 | Studtmann | ........... | H01H 47/325 361/154 |
| 4,953,053 A * | 8/1990 | Pratt | ...................... | H02H 7/085 318/465 |
| 4,953,083 A * | 8/1990 | Takata | .................. | G06F 9/4436 710/7 |
| 4,965,847 A * | 10/1990 | Jurkowski | ............... | H02P 23/08 318/366 |
| 5,027,049 A * | 6/1991 | Pratt | ...................... | H02P 27/06 318/798 |
| 5,072,393 A * | 12/1991 | Mori | ................... | B60T 8/17616 303/163 |
| 5,404,303 A * | 4/1995 | Pattantyus | .......... | B60T 8/17616 701/78 |
| 5,479,090 A * | 12/1995 | Schultz | ................. | H02M 3/156 323/284 |
| 6,493,204 B1 * | 12/2002 | Glidden | .................... | B60T 8/36 361/154 |
| 7,071,740 B2 * | 7/2006 | Adams | ................. | H03K 5/1252 327/110 |
| 7,161,787 B2 * | 1/2007 | Joens | ............... | H03K 17/04106 361/140 |
| 7,950,514 B1 * | 5/2011 | Nurnberg | ................ | B66B 29/00 198/322 |
| 8,299,771 B2 * | 10/2012 | Williams | ................ | H03F 3/217 323/283 |

* cited by examiner

*Primary Examiner* — Rita Leykin
(74) *Attorney, Agent, or Firm* — Cantor Colburn LLP

(57) ABSTRACT

A system and method for controlling a brake coil in a motor having a control processor and a controller in communication with the control processor, the controller comprising a processor and memory with instructions stored thereon when executed by the processor cause the controller to receive signals indicative of threshold current values for the brake coil; provide enabling signals to each of a high-side and low-side driver circuit; receive signals indicative of a sensed current in the brake coil; compare the sensed current with the threshold current values; and provide an adjustment signal if the sensed current is outside a known range of values for the threshold current values.

13 Claims, 2 Drawing Sheets

BRAKE CONTROLLER

BACKGROUND

The subject matter disclosed herein relates generally to aircraft flight surfaces and, more particularly, to a controller that controls energizing current provided to a brake coil in an aircraft brake.

DESCRIPTION OF RELATED ART

Aircraft commonly include movable flight control surfaces on their wings. These surfaces are known as flaps or slats, and can be selectively extended or retracted to modify the lift producing characteristics of the wings. A power drive unit (PDU) is used to selectively move the flaps or slats by providing a motive force to drive actuators that are connected to the movable flaps or slats. To prevent asymmetry during actuation of these flaps or slats, electromagnetic combined motor brake structures are commonly used. These brakes can include brakes in the PDU or specialized asymmetry brakes at each end of the wing. These brakes are customarily designed such that they are normally applied to prevent rotation of a load shaft in the absence of energization of the motor.

Typically, an electromagnetic brake is energized through a coil in order to release the load shaft upon or immediately after energization of a motor circuit. Most aircraft systems use a 28V supply to control these motor brake structures through a low voltage condition and a high voltage condition. However, the voltage range of operation for these motor brakes can vary from 18 Volt to 33 Volt. As voltage varies, the amount of current across the brake coil can be in excess of what is required and results in excess power dissipation across the brake coil and the circuit. A controller than can accurately control current to a brake coil that adds operating efficiency to both a circuit and an aircraft electrical interface would be well received in the art.

BRIEF SUMMARY

According to one aspect of the invention, a system for controlling a brake coil in a brake includes a control processor; a controller in communication with the control processor, the controller comprising a processor and memory with instruction stored thereon when executed by the processor cause the controller to: receive signals indicative of one or more threshold current values for the brake coil; provide enabling signals to each of a high-side and low-side driver circuit; receive signals indicative of a sensed current in the brake coil; compare the sensed current with the one or more threshold current values; and provide an adjustment signal if the sensed current is outside a known range of values for the threshold current value.

In addition to one or more of the features described above, or as an alternative, further embodiments could include a processor that is configured to enable the low side driver circuit with a pulse width modulated signal.

In addition to one or more of the features described above, or as an alternative, further embodiments could include a processor that is configured to provide the adjustment signal to the low side driver circuit if the sensed current is outside the one or more threshold current values.

In addition to one or more of the features described above, or as an alternative, further embodiments could include a processor that is configured to receive the one or more threshold current values as a high-current value and a low-current value.

In addition to one or more of the features described above, or as an alternative, further embodiments could include a processor that is configured to enable the low side driver circuit with an initial fixed voltage signal followed by a pulse width modulated signal after a predetermined timeperiod of the initial fixed voltage signal.

In addition to one or more of the features described above, or as an alternative, further embodiments could include a processor that is configured to enable the high-side and low-side driver circuits to provide a high-current in the brake coil in a pull-in mode.

In addition to one or more of the features described above, or as an alternative, further embodiments could include a processor that is configured to enable the high-side and low-side driver circuits to provide an energizing low-current value in the brake coil, the energizing low-current value being provided in a pass-through mode of operation.

In addition to one or more of the features described above, or as an alternative, further embodiments could include a Digital-to-Analog (D/A) converter in serial communication with the controller for receiving the one or more threshold current values.

According to another aspect of the invention, a method for controlling a brake coil controlling a brake coil in a motor includes: receiving, with a processor, signals indicative of one or more threshold current values for the brake coil; providing, with a processor, enabling signals to each of a high-side and low-side driver circuit; receiving, with the processor, signals indicative of a sensed current in the brake coil; comparing, with the processor, the sensed current with the one or more threshold current values; and providing, with the processor, an adjustment signal if the sensed current is outside a known range of values for the threshold current value.

In addition to one or more of the features described above, or as an alternative, further embodiments could include enabling the low side driver circuit with a pulse width modulated signal.

In addition to one or more of the features described above, or as an alternative, further embodiments could include providing the adjustment signal to the low side driver circuit if the sensed current is outside the one or more threshold current values.

In addition to one or more of the features described above, or as an alternative, further embodiments could include receiving the one or more threshold current values as a high-current value and a low-current value.

In addition to one or more of the features described above, or as an alternative, further embodiments could include enabling the low side driver circuit with an initial fixed voltage signal followed by a pulse width modulated signal after a predetermined timeperiod of the initial fixed voltage signal.

In addition to one or more of the features described above, or as an alternative, further embodiments could include enabling the high-side and low-side driver circuits to provide a high-current in the brake coil in a pull-in mode.

In addition to one or more of the features described above, or as an alternative, further embodiments could include enabling the high-side and low-side driver circuits to provide an energizing low-current value in the brake coil, the energizing low-current value being provided in a pass-through mode of operation.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

Other aspects, features, and techniques of the invention will become more apparent from the following description taken in conjunction with the drawings.

DETAILED DESCRIPTION

Figure 1:
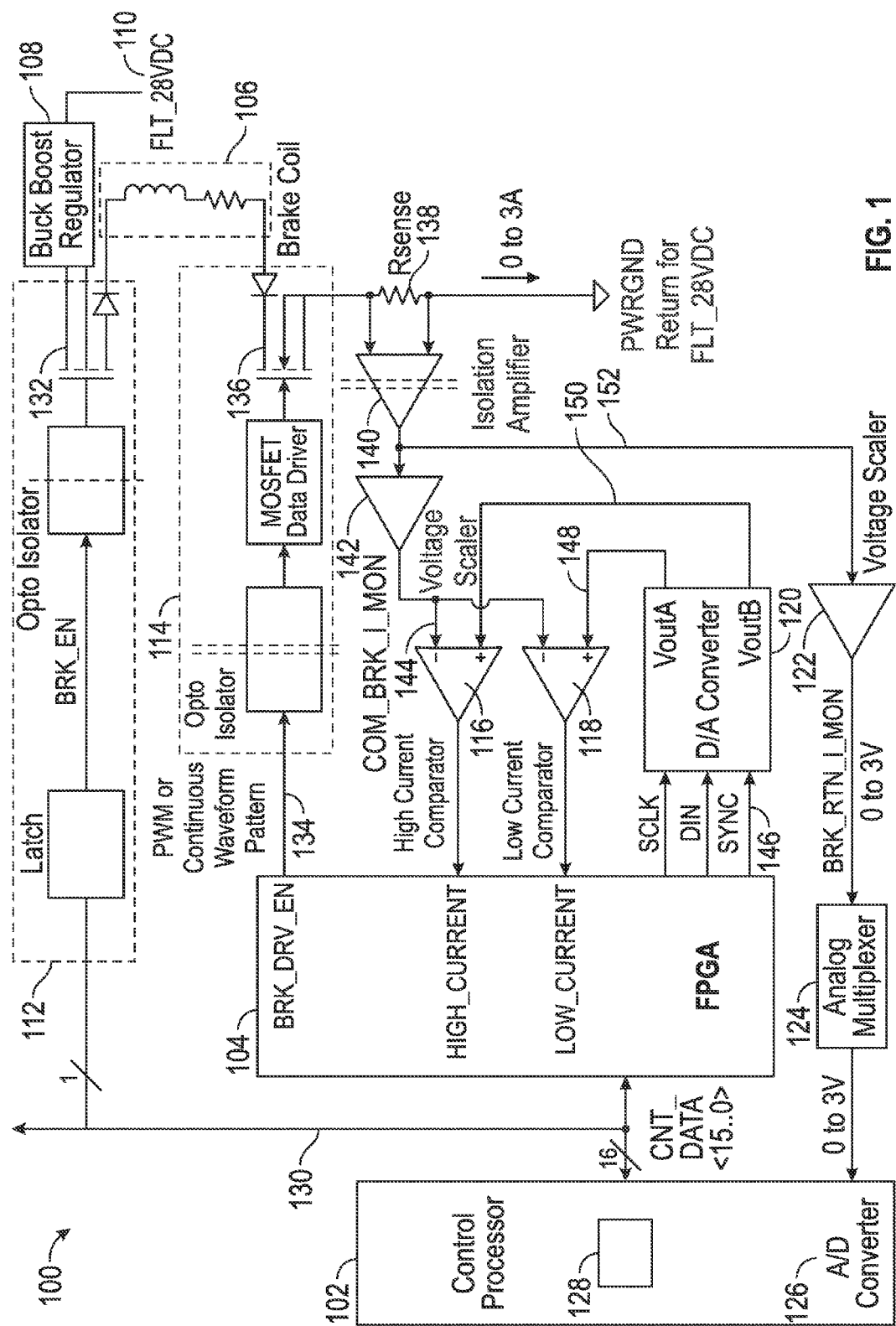
FIG. 1 is schematic view of an exemplary control system according to an embodiment of the invention.

Referring to the drawings, FIG. 1 is an exemplary schematic view of a control system 100 according to an embodiment of the invention. Control system 100 provides control of coil currents in a brake coil 106 of a motor brake that is needed precise control of torque transferred to flaps or slats by one or more actuators according to an embodiment of the invention. The invention may be implemented using hardware, software, or a combination thereof and may be implemented in control system 100. While control system 100 is shown being implemented with a single brake coil 106, it is to be appreciated that additional brake coils substantially similar are also contemplated for use with control system 100 where each brake coil can be configured to receive signals over an independent communication channel.

Control system 100 includes a control processor 102, a field programmable grid array (FPGA) controller 104, a high-side driver circuit 112, and low-side driver circuit 114. Control processor 102 may be any type of processor, e.g., central processing unit (CPU) or graphics processing unit (GPU), including a general purpose processor, a digital signal processor, a microcontroller, an application specific integrated circuit, or the like. Control processor 102 is in communication with an analog-to-digital (A/D) converter 126 and memory 128. A/D converter 126 receives analog voltage signals from analog multiplexer 124 and converts it into digital signals for processing by control processor 102. Control processor 102 includes algorithms for communicating signals over communication line 130 to one or more devices associated with control system 100 including communicating signals of initial data parameters to FPGA controller 104 during configuration, setting-up, or built-in self-test of FPGA controller 104. Memory 128 can include main memory and secondary memory. Main memory can include random access memory (RAM), while secondary memory can include one or more databases, a hard disk storage unit, and one or more removable storage units representing a floppy disk drive, a magnetic tape drive, an optical disk drive, a removable memory chip (such as an erasable programmable read only memory (EPROM) or programmable read-only memory (PROM)) and its associated socket. Main memory can store one or more algorithms for implementing the embodiments described herein.

FPGA controller 104 can also include a processor and memory. Processor in FPGA controller 104 may be substantially similar to processor 102 and can include memory that stores one or more algorithms as executable instructions for providing closed loop control of current in brake coil 106 for a plurality of operating modes such as, for example, a pass through mode, a pull-in and hold pulse width modulated (PWM) mode, and a high-low current PWM mode. The plurality of modes of operation are fully programmable in terms of the targeted brake coils, i.e. current levels, ON duration and PWM frequency and can be adjusted on the fly by processor 102. FPGA controller 104 is configured to supply signals for enabling a high-side driver circuit 112 and a low-side driver circuit 114 in order to control voltage and hence current provided to brake coil 106 for energizing brake coil 106 in the plurality of above operating modes.

In an exemplary closed loop control of brake coil 106 for a pass through mode, FPGA controller 104 can configure control system 100 to provide a fixed low-current value to brake coil 106 so as to energize brake coil 106 (i.e., turn it ON). In an example, brake coil 106 can be energized with a coil current in the range of about 0.5 Ampere (Amp) to about 2.1 Ampere (Amp). Additionally, FPGA controller 104 enables both a high-side driver circuit 112 and a low-side driver circuit 114 by communicating enable signals on communication lines 130, 134 to turn ON respective switches 136, 132. In embodiments, switches 132, 136 can be a FET, mosfet, BJT, or the like. Buck-boost converter 108 receives a 28 Volt DC supply 110 from a DC power source (not shown) and provides a fixed DC voltage to switch 132.

The FPGA controller 104 stores values of known coil currents that are needed to energize brake coil 106 in the pass-through mode. These stored values of coil currents are received from control processor 102. The stored values are provided to D/A converter 120 over serial interface 146 as reference threshold values in order to set the reference voltages 148, 150 at voltage comparators 116, 118. Turning ON high-side driver circuit 112 provides a voltage and current to brake coil 106 from buck-boost converter 108, thereby energizing brake coil 106 to turn it ON. Sense resistor 138 (Rsense) senses the current flowing through brake coil 106 and provides a proportional voltage to the sensed current to comparators 116, 118 via an isolation amplifier 140 and voltage scaler 142. Voltage comparator 116 compares the output voltage 144 with stored values of reference voltage 150 for an upper limit current (high threshold current) while voltage comparator 118 compares the output voltage 144 with a stored value of reference voltage 148 for a lower limit current (low threshold current). The FPGA controller 104 determines if the reference voltage is higher or lower than the output voltage and provides a PWM adjustment signal to low side driver circuit 114 to control the current in brake coil 106 to be within the upper and lower threshold limits of current as set by the reference voltages at 148, 150 once in the window for normal current low-side is returned to ON. Additionally, voltage on line 152 is provided as a feedback signal to A/D converter 126 of control processor 102 through voltage scaler 122 and analog multiplexer 124 for comparison to upper and lower threshold limits of voltages for currents in the pass-through mode to determine if one or more channels associated with the brake coil 106 are operating within known values for a secondary independent path to monitor proper operation of FPGS controller 104.

In an exemplary closed loop control of brake coil 106 for a pull-in and hold PWM mode, FPGA controller 104 can configure control system 100 to provide an initial high-current to brake coil 106 to energize it (pull-in configuration) and turn ON respective switches 132, 136, and after a defined or predetermined time-period, pulse width modulate the low-side driver circuit 114 to provide a low current to maintain the brake coil 106 being energized (hold configuration). In an example, the FPGA controller 104 is configured to control system 200 by providing brake coil 106 with a current of 1.8 Amps at 300 milliseconds (for pull-in), and pulse width modulate (PWM) switch 136 to generate 0.8 milliamps in order to maintain brake coil 106 being energized. The FPGA controller 104 receives and stores, from control processor 102, threshold values of known pull-in currents and known hold currents that are needed for brake coil 106 and implements these conditions through one or more algorithms. These stored values are provided to D/A converter 120 over serial interface 146 as reference threshold limits in order to set the reference voltages 148, 150 at voltage comparators 116, 118. Additionally, voltage on line 152 is provided as a feedback signal to A/D converter 126 of control processor 102 through voltage scaler 122 and analog multiplexer 124 for comparison to upper and lower threshold limits of pull-in currents to determine if one or more channels associated with the brake coil 106 is operating within known values for a secondary independent path to monitor proper operation of FPGA controller 104.

Initially, the FPGA controller 104 will turn ON high-side driver circuit 112 and low-side driver circuit 114 by communicating enable signals on communication lines 130, 134 to turn ON respective switches 132, 136. Enabling circuits 112, 114 will provide a voltage and current from buck-boost converter 108 to brake coil 106, energizing brake coil 106 to turn it ON. FPGA controller 104 includes instructions for energizing brake coil 106 for a predetermined timeperiod, for example, of 300 milliseconds (ms). Sense resistor 138 (Rsense) senses the current flowing through brake coil 106 and provides a proportional voltage of the sensed current to comparators 116, 118 through an isolation amplifier 140 and voltage scaler 142. Voltage comparator 116 compares the output voltage 144 with stored threshold values of reference voltage 150 for an upper limit current while voltage comparator 118 compares the output voltage 144 with a stored threshold values of reference voltage 148 for a lower limit current. The FPGA controller 104 determines if the reference voltage is higher or lower than the output voltage and provides a pull-in voltage adjustment signal on communication line 134 to low side driver circuit 114 in order to control the current in brake coil 106 and keep it within the upper and lower threshold values of pull-in current. Additionally, voltage on line 152 is provided as a feedback signal to A/D converter 126 of control processor 102 through voltage scaler 122 and analog multiplexer 124 for comparison to upper and lower threshold limits of pull-in currents to determine if one or more channels associated with the brake coil 106 is operating within known values for a secondary independent path to monitor proper operation of FPGA controller 104.

After the predetermined timeperiod, FPGA controller 104 can provide PWM signals switch 136 in order to pulse width modulate a hold current in brake coil 106 in order to maintain the brake coil 106 being energized. Sense resistor 138 (Rsense) senses the current flowing through brake coil 106 and provides a proportional voltage of the sensed current to comparators 116, 118 through an isolation amplifier 140 and voltage scaler 142. Voltage comparator 116 compares the output voltage 144 with stored values of reference voltage 150 for an upper limit hold current while voltage comparator 118 compares the output voltage 144 with a stored value of reference voltage 148 for a lower limit hold current. The FPGA controller 104 determines if the reference voltage is higher or lower than the output voltage and can provide PWM signals to switch 136 of low-side driver 114 to control the current in brake coil 106 to keep it within the upper and lower limits of hold current. Additionally, voltage on line 152 is provided as a feedback signal to A/D (Analog-to-Digital) converter 126 of control processor 102 through voltage scaler 122 and analog multiplexer 124 for comparison to upper and lower threshold limits of hold currents to determine if one or more channels associated with the brake coil 106 are operating within known values for a secondary independent path to monitor proper operation of FPGA controller 104.

In an exemplary closed loop control of brake coil 106 for a high-low current mode, FPGA controller 104 can configure control system 100 to provide fixed high- and low-control currents to brake coil 106 that are within a high- and low-current window. In an example, FPGA controller 104 will control high-side and low-side driver circuits 112, 114 in order to provide brake coil 106 with a high-current threshold of 1.8 Amps and a low-current threshold of 1.0 Amp. The FPGA controller 104 receives and stores values of known high- and low-current thresholds from control processor 102 that are needed for brake coil 106 and implements these conditions through one or more algorithms. These stored threshold values are provided to (Digital-to-Analog) D/A converter 120 over serial interface 146 as reference threshold values in order to set the reference voltages 148, 150 at voltage comparators 116, 118 that correspond to threshold high- and low-currents.

The FPGA controller 104 will turn ON high-side driver circuit 112 and low-side driver circuit 114 by communicating enable signals on communication lines 130, 134 to turn ON respective switches 132, 136. For example, FPGA controller 104 will communicate a fixed voltage signal on communication line 130 to turn ON high-side driver circuit 112 and will communicate PWM signals on communication line 134 to turn ON low-side driver circuit 114. Enabling circuits 112, 114 will provide a voltage and current through brake coil 106 energizing it and turning it ON. Sense resistor 138 (Rsense) senses the current flowing through brake coil 106 and provides a proportional voltage of the sensed current to comparators 116, 118 through an isolation amplifier 140 and voltage scaler 142. Voltage comparator 116 compares the output voltage 144 with stored threshold values of reference voltage 150 for an upper limit current while voltage comparator 118 compares the output voltage 144 with a stored threshold values of reference voltage 148 for a lower limit current. The FPGA controller 104 determines if the reference voltage is higher or lower than the output voltage and can provide PWM voltage signals to switch 136 of low-side driver circuit 114 to control the current in brake coil 106 to keep it within the high- and low-current thresholds. Additionally, voltage on line 152 is provided as a feedback signal to A/D converter 126 of control processor 102 through voltage scaler 122 and analog multiplexer 124 for comparison to upper and lower threshold limits of currents to determine if one or more channels associated with the brake coil 106 is operating within known values for a secondary independent path to monitor proper operation of FPGA controller 104.

Figure 2:
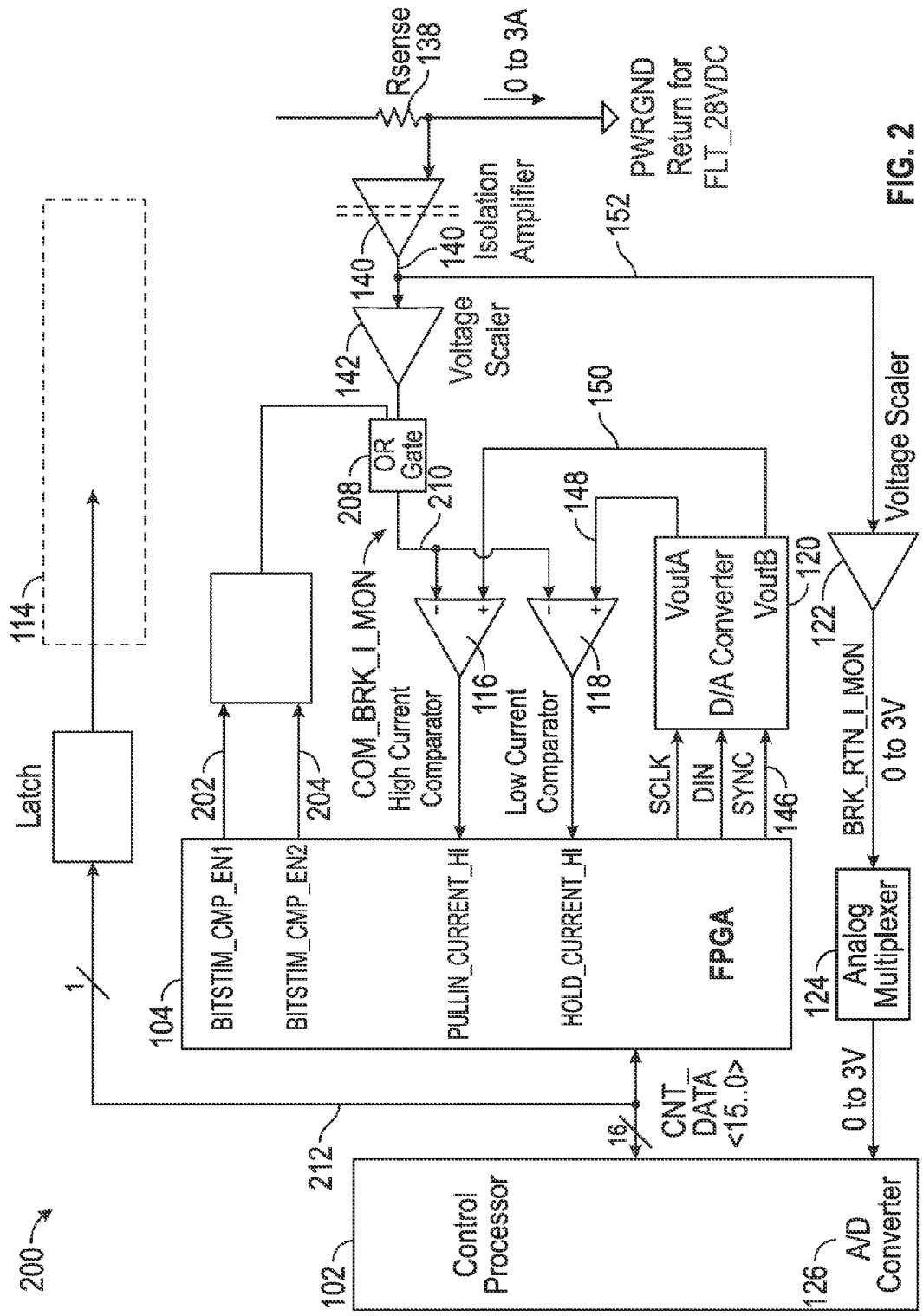
FIG. 2 is a schematic view of circuitry for a built-in self-test of a control system according to an embodiment of the invention.

FIG. 2 is a schematic view of circuitry of control system 200 for a built-in self-test (BIST) of FPGA controller 104 according to an embodiment of the invention. Initially, control processor 102 communicates one or more parameters to FPGA controller 104 for validation of hardware associated within control system 200. For example, Control processor 102 can communicate one or more signals associated with duty-cycle, PWM period, frequency, high-current threshold, low-current threshold to FPGA controller 104 that are stored in memory on FPGA controller 104. In order to validate hardware, FPGA controller 104 can arbitrarily provide values of high pull-in current and low pull-in current as reference limits to D/A converter 120 over serial interface 146 in order to set the reference voltages 148, 150 for voltage comparators 116, 118. FPGA controller 104 commands test signals 202 and 204 through OR-gate 208. Voltage comparator 116 compares the output voltage 210 from OR-gate with a stored value of reference voltage 150 for an upper limit current while voltage comparator 118 compares the output voltage 210 with a stored value of reference voltage 148 for a lower limit current.

In order to toggle or change state of the voltages from comparators 116, 118, FPGA controller 104 provides additional arbitrary values of high pull-in current and low-pull-in current to D/A converter and sets a different threshold limit for reference voltages 148, 150. Voltage comparators 116, 118 compare the new output voltage 210 to reference voltages 148, 150 to ensure that voltages from comparators 116, 118 toggle or change state in the other direction from the original direction of initial comparator voltages.

Benefits of the embodiments described herein include an FPGA controller that can accurately control current to a brake coil within a threshold current value thereby adding operating efficiency to both a circuit and an aircraft electrical interface. The FPGA controls brake coil current by providing control signals to each of a high-side and low-side driver circuit. The FPGA controller senses the current in the brake coil and may provide an adjustment signal that controls the brake coil current if the sensed current is outside a known range of values for a threshold current value.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for controlling a brake coil in a brake, comprising:
    a control processor;
    a controller in communication with the control processor, the controller comprising a processor and memory with instruction stored thereon when executed by the processor cause the controller to:
        receive signals indicative of threshold current values for the brake coil;
        provide enable signals to each of a high-side and low-side driver circuit;
        receive signals indicative of a sensed current in the brake coil;
        compare the sensed current with the threshold current values; and
        provide an adjustment signal if the sensed current is outside a known range for the threshold current values;
    wherein the control processor is configured to enable the low side driver circuit with an initial fixed voltage signal followed by a pulse width modulated signal after a predetermined time period of the initial fixed voltage signal.

2. The system of claim 1, wherein the processor is configured to enable the low side driver circuit with a pulse width modulated signal.

3. The system of claim 1, wherein the processor is configured to provide the adjustment signal to the low side driver circuit if the sensed current is outside the threshold current values.

4. The system of claim 1, wherein the processor is configured to receive the threshold currents as a high-current value and a low-current value.

5. The system of claim 1, wherein the processor is configured to enable the high-side and low-side driver circuits to provide a high-current in the brake coil in a pull-in mode.

6. The system of claim 1, wherein the processor is configured to enable the high-side and low-side driver circuits to provide an energizing low-current value in the brake coil, the energizing low-current value being provided in a pass-through mode of operation.

7. The system of claim 1, further comprising a Digital-to-Analog (D/A) converter in serial communication with the controller for receiving the threshold current values.

8. A method of controlling a brake coil in a motor, comprising:
    receiving, with a processor, signals indicative of one or more threshold current values for the brake coil;
    providing, with a processor, enabling signals to each of a high-side and low-side driver circuit;
    enabling the low side driver circuit with an initial fixed voltage signal followed by a pulse width modulated signal after a predetermined time period of the initial fixed voltage signal;
    receiving, with the processor, signals indicative of a sensed current in the brake coil;
    comparing, with the processor, the sensed current with the one or more threshold current values; and
    providing, with the processor, an adjustment signal if the sensed current is outside a known range of values for the threshold current values.

9. The method of claim 8, further comprising enabling the low side driver circuit with a pulse width modulated signal.

10. The method of claim 8, further comprising providing the adjustment signal to the low side driver circuit if the sensed current is outside the threshold current values.

11. The method of claim 8, further comprising receiving the threshold current values as a high-current value and a low-current value.

12. The method of claim 8, further comprising enabling the high-side and low-side driver circuits to provide a high-current in the brake coil in a pull-in mode.

13. The method of claim 8, further comprising enabling the high-side and low-side driver circuits to provide an energizing low-current value in the brake coil, the energizing low-current value being provided in a pass-through mode of operation.

* * * * *